(12) United States Patent
Raskar et al.

(10) Patent No.: US 10,845,874 B1
(45) Date of Patent: Nov. 24, 2020

(54) VERGENCE DETERMINATION

(71) Applicant: Facebook Technologies, LLC, Menlo Park, CA (US)

(72) Inventors: Ramesh Raskar, Palo Alto, CA (US); Neeraj Choubey, Belmont, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/704,255

(22) Filed: Dec. 5, 2019

Related U.S. Application Data

(63) Continuation of application No. 16/132,153, filed on Sep. 14, 2018, now Pat. No. 10,627,901.

(51) Int. Cl.
*G06F 3/01* (2006.01)
*G06T 7/11* (2017.01)
*G06T 7/00* (2017.01)
*G02B 27/01* (2006.01)
*G06T 19/00* (2011.01)

(52) U.S. Cl.
CPC ......... *G06F 3/013* (2013.01); *G02B 27/0172* (2013.01); *G06T 7/11* (2017.01); *G06T 7/97* (2017.01); *G02B 2027/0138* (2013.01); *G06T 19/006* (2013.01); *G06T 2207/20081* (2013.01); *G06T 2207/30041* (2013.01)

(58) Field of Classification Search
CPC ......... G06F 3/013; G06T 7/11; G06T 7/0002; G06T 7/55; G06T 7/97; G06T 2207/20081; G06T 2207/30041; G06T 19/006; G02B 27/0172; G02B 2027/0138
See application file for complete search history.

(56) References Cited

U.S. PATENT DOCUMENTS

| | | | | |
|---|---|---|---|---|
| 9,984,507 | B2 * | 5/2018 | Aksoy | G06T 19/006 |
| 10,013,055 | B2 * | 7/2018 | Perek | G02F 1/13 |
| 10,061,352 | B1 * | 8/2018 | Trail | G02B 27/0172 |
| 10,282,912 | B1 * | 5/2019 | Yuan | G06F 3/011 |
| 10,319,266 | B1 * | 6/2019 | Percival | G02B 27/0172 |
| 10,345,590 | B2 * | 7/2019 | Samec | A61B 3/113 |
| 2013/0300634 | A1 * | 11/2013 | White | G02B 27/017 345/7 |
| 2017/0262054 | A1 * | 9/2017 | Lanman | G02B 27/0068 |
| 2017/0293145 | A1 * | 10/2017 | Miller | G02B 27/0093 |

* cited by examiner

*Primary Examiner* — Chad M Dicke
(74) *Attorney, Agent, or Firm* — Baker Botts L.L.P.

(57) ABSTRACT

In one embodiment, a computing system may determine that a performance metric of an eye tracking system is below a performance threshold. The eye tracking system may be associated with a head-mounted display worn by a user. In response to the determination that the performance metric is below the performance threshold, the system may identify one or more contents being displayed by the head-mounted display. The system may access one or more properties associated with the one or more contents. The system may predict a vergence distance of the user based at least on the one or more properties associated with the one or more display contents. The system may adjust one or more configurations based on the predicted vergence distance of the user.

20 Claims, 11 Drawing Sheets

VERGENCE DETERMINATION

PRIORITY

This application is a continuation under 35 U.S.C. § 120 of U.S. patent application Ser. No. 16/132,153, filed 14 Sep. 2018.

TECHNICAL FIELD

This disclosure generally relates to artificial reality, such as virtual reality and augmented reality.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

Particular embodiments described herein relate to a method of determining vergence of a user using a combination of eye tracking based approaches (e.g., 3D eye tracking, machine learning based eye tracking), body-based approaches (e.g., head position/movement, hand position/movement, body position/movement) and content-based approaches (e.g., Z-buffer, face detection, application-developer provided information). Particular embodiments detect malfunction of an eye tracking system (e.g., data being out of range or no data from eye tracking system at all) and, upon detection of malfunction, approximate the user vergence using a combination of the approaches. In particular embodiments, a fusion algorithm weights the inputs from all these approaches and determine where the user is likely looking at (e.g., using a piecewise comparison). For example, when the headset detects that the user's hand has picked up a virtual object and is moving toward his face, the fusion algorithm may infer that the user is looking at the virtual object in his hand. Upon identifying the virtual object as the likely subject of the user's gaze, the system may determine an appropriate Z-depth for the display screen and adjust configurations of artificial reality system (e.g., changing a rendering image, moving a display screen, moving an optics block) accordingly to eliminate or ameliorate the negative effects caused by vergence accommodation conflict.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
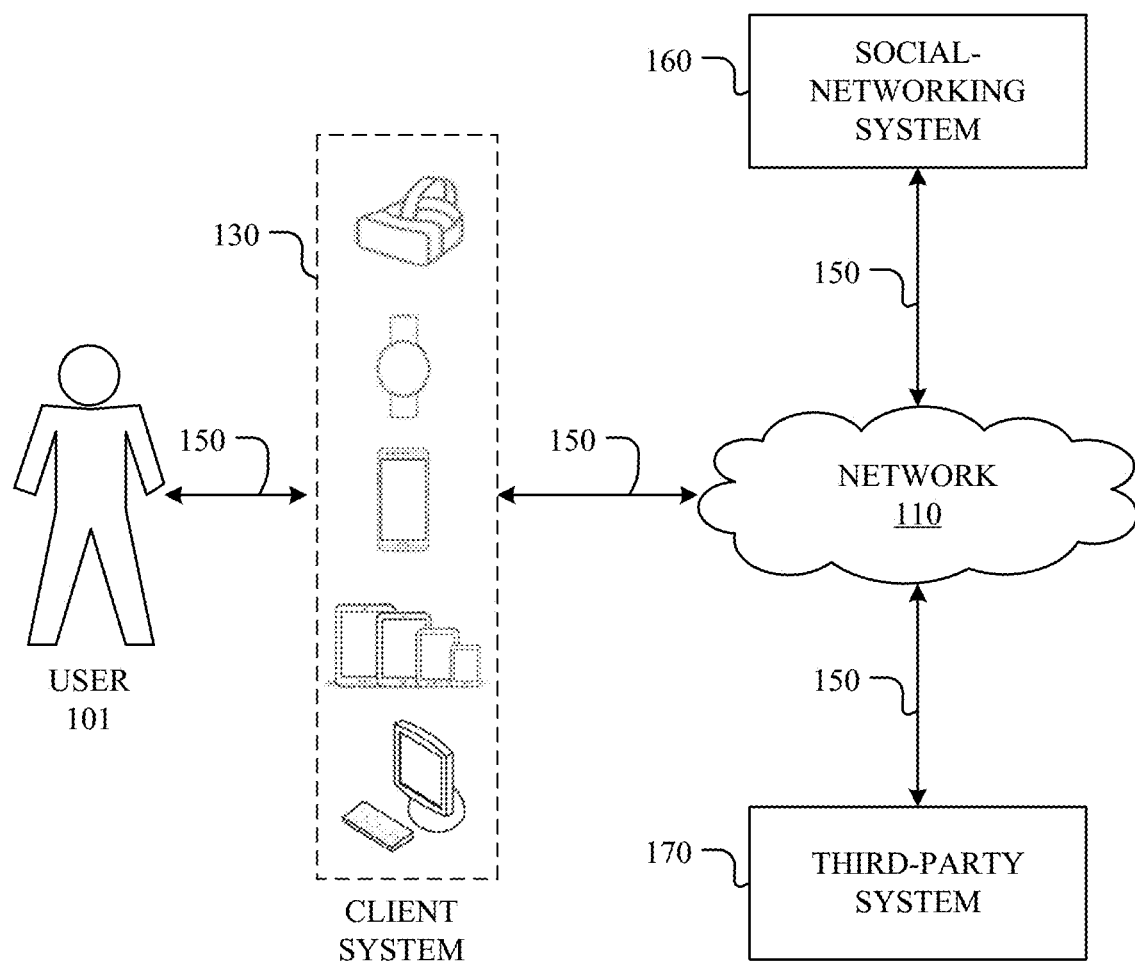
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server (or other suitable component(s)) that allows users 101 to opt in to or opt out of having their actions logged by social-networking system 160 or shared with other systems (e.g., third-party systems 170), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. In particular embodiments, third-party system 170 may be a network-addressable computing system. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, a tablet computer, or an augmented/virtual reality device.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 2:
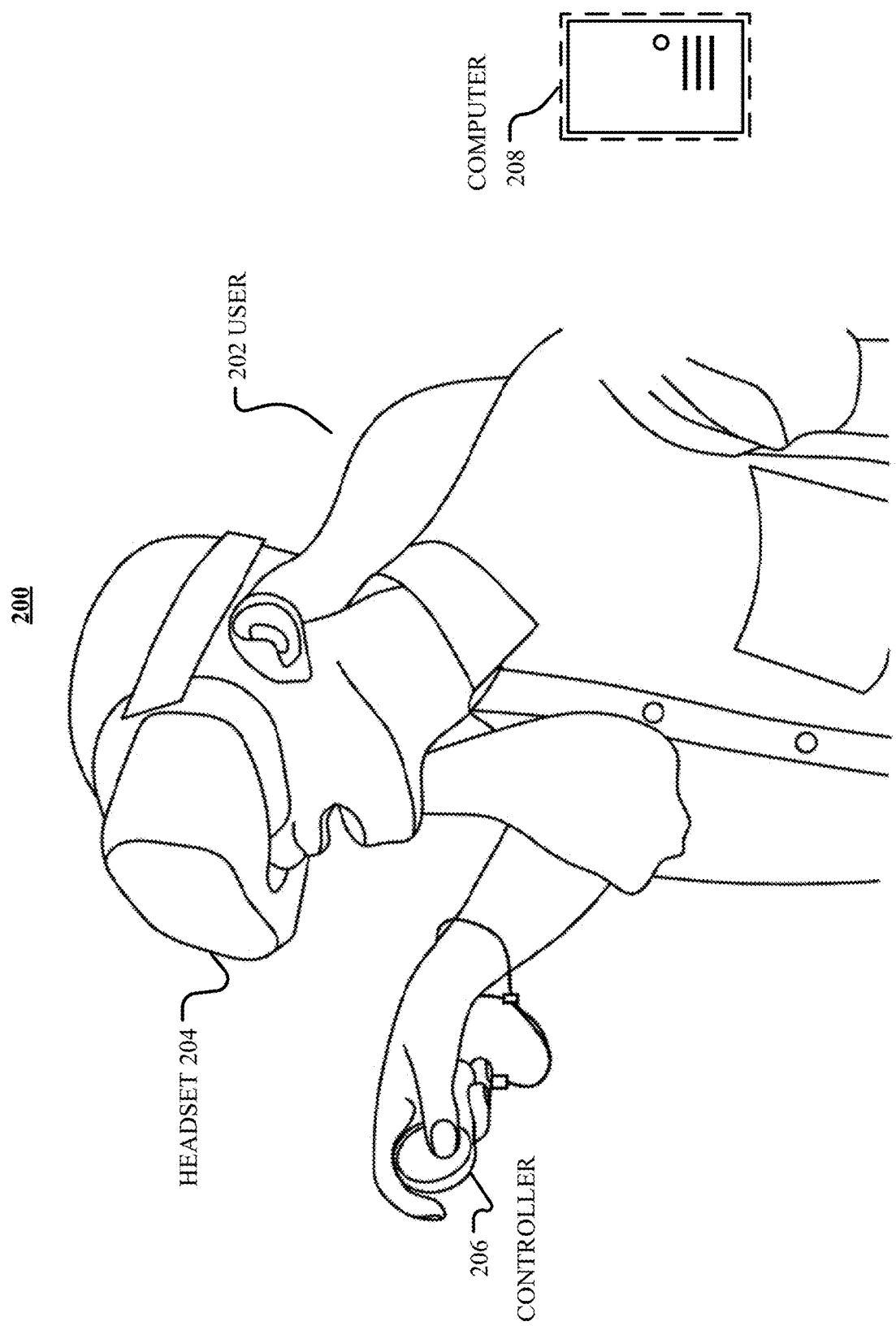
FIG. 2 illustrates an example artificial reality system.

FIG. 2 illustrates an example artificial reality system 200. In particular embodiments, the artificial reality system 200 may comprise a headset 204 (e.g., a head-mounted display (HMD)), a controller 206, and a computing system 208. A user 202 may wear the headset 204 that may display visual artificial reality content to the user 202. The headset 204 may include an audio device that may provide audio artificial reality content to the user 202. The headset 204 may include one or more cameras which can capture images and videos of environments. The headset 204 may include an eye tracking system to determine the vergence of the user 202. The headset 204 may include one or more display screens for rendering the artificial reality content. The controller 206 may comprise a trackpad and one or more buttons. The controller 206 may receive input from the user 202 and relay the input to the computing system 208. The controller 206 may also provide haptic feedback to the user 202. The computing system 208 may be connected to the headset 204 and the controller 206 through cables or wireless connections. The computing system 208 may control the headset 204 and the controller 206 to provide the artificial reality content to and receive input from the user 202. The computing system 208 may be a standalone host computer system, an on-board computer system integrated with the headset 204, a mobile device, or any other hardware platform capable of providing artificial reality content to and receiving input from the user 202. In this disclosure, the terms of "headset" and "head-mounted display" may be interchangeably used to refer to a head-mounted device for the artificial reality system.

A vergence distance may be a distance from the user's eyes to objects (e.g., real-world objects or virtual objects in a virtual space) that the user's eyes are converged at. A focus distance may be a distance from the user's eyes to the objects that the user's eye are accommodated to. In real world, when the two eyes of a user are gazing at a real object, the two eyes both are converged and accommodated to that object. The vergence distance and focal distance of the two eyes match with each other. In artificial reality, the user may gaze at virtual objects rendered on a head-mounted display. The user's two eyes may converge to the virtual objects, which can be relatively far from the user in a virtual space, while being accommodated on the head-mounted display, which is relatively close the user's eyes. The mismatch between the vergence and the accommodation of the user's eyes may lead to vergence accommodation conflict which may negatively impact the artificial reality experience. For example, vergence accommodation conflict may over time cause eye strain or onset of VR sickness to the user.

Figure 3:
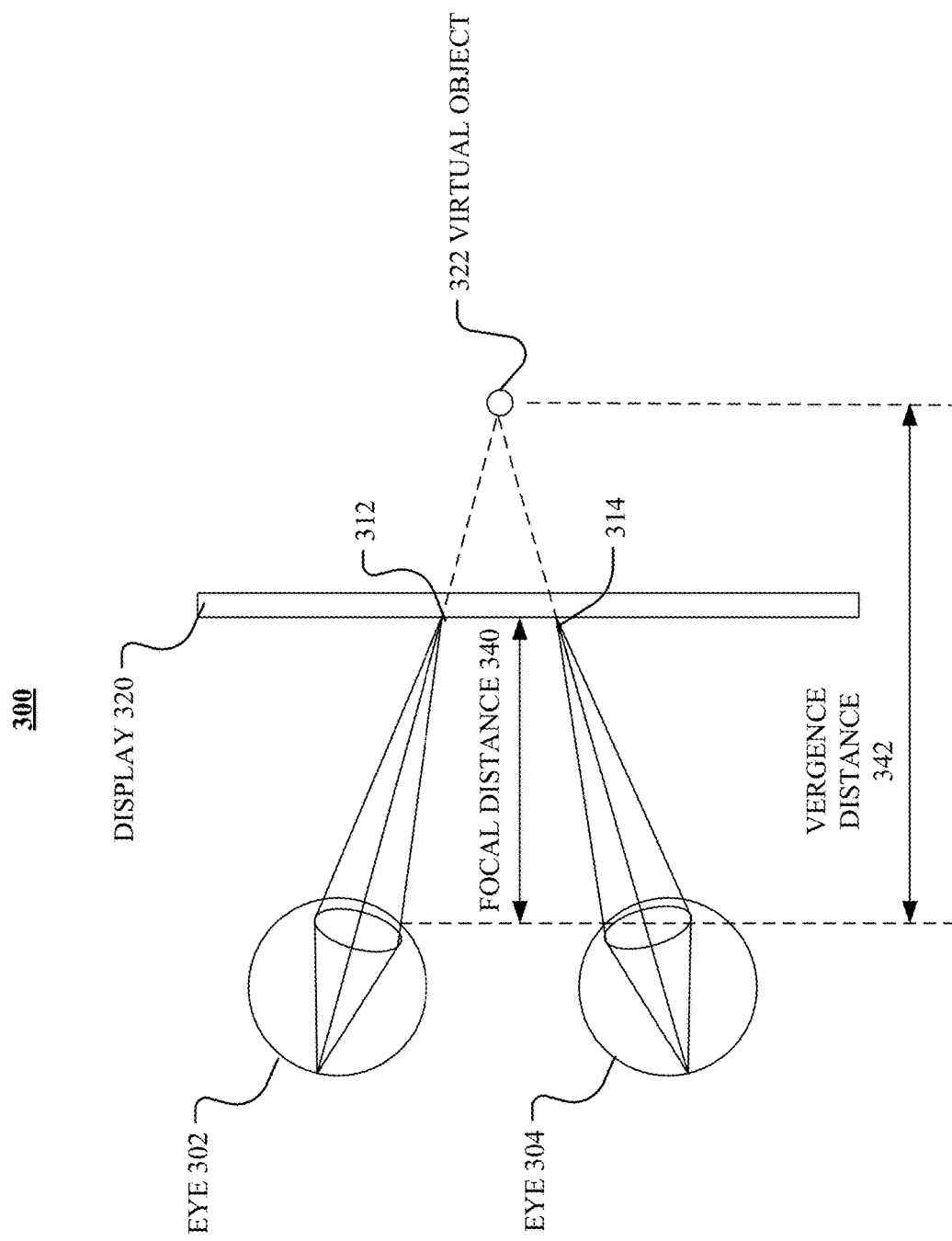
FIG. 3 illustrates an example situation for vergence accommodation conflict in a head-mounted display.

FIG. 3 illustrates an example situation for vergence accommodation conflict in a head-mounted display 300. The head-mounted display 300 may have a display screen 320 for displaying content to a user's eyes 302 and 304. The display 320 may render a virtual object 322 to the user. The user' two eyes of 302 and 304 may be gazing at the virtual object 322. In this situation, the vergence distance 342 or gaze depth of the user's two eyes is corresponding to the virtual distance between the eyes (302, 304) and the virtual object 322. However, the two eyes 302 and 304 may have a focal distance 340 because they are accommodated to the display screen 320 which is the actual light source for this virtual object 322. The mismatch between the focal distance 340 and the vergence distance 342 causes the vergence accommodation conflict which may negatively impact the artificial reality experience provided by the head mounted-display 300. Particular embodiments solve the vergence accommodation conflict problem and improve the user experience for the artificial reality.

Figure 4:
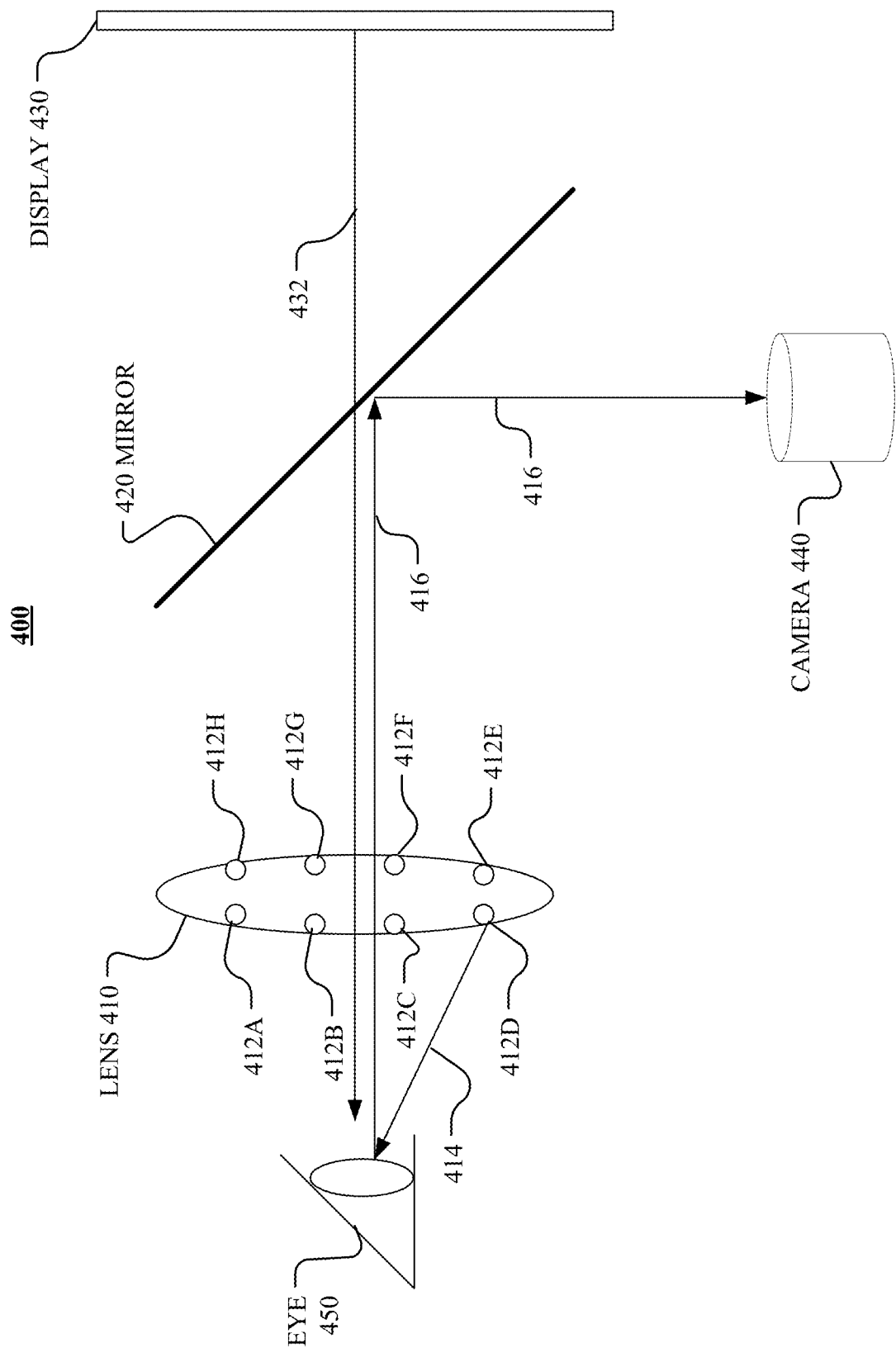
FIG. 4 illustrates an example 3D eye tracking system.

In particular embodiments, the artificial reality headset system may include an eye tracking system for tracking the user's eyes in real time. The eye tracking system may be a 3D eye tracking system tracking the user's eye movements (e.g., gazing direction, gazing angle, gazing depth, convergence) and determine where the user is looking at (e.g., vergence distance or gazing point). FIG. 4 illustrates an example 3D eye tracking system 400. The 3D eye tracking system 400 may track three-dimensional eye motion to determine the user's vergence distance or gazing point. The eye tracking system 400 may include a lens 410, a number of infrared light sources (e.g., 412A-H), a hot mirror 420, and an infrared camera 440. The light sources 412A-H may be infrared LEDs mounted on the lens 410. The hot mirror 420 may be a dichroic filter which reflects infrared light while allowing visible light to pass. The emitted infrared light (e.g., 414) by one or more of the light source 412A-H may reach and be reflected off the eye 450. The reflected light 416 may be further reflected by the hot mirror 420 and reach the infrared camera 440. The camera 440 may be an infrared camera capturing images of the eye 450 using the reflected infrared light. The eye tracking system 400 may capture images of both eyes (e.g., pupils) of the user and process the images using computer vision technology. The eye tracking system 400 may measure the angle of the two eyes and use geometric relations to determine the vergence distance and gazing point of the user. The 3D eye tracking system 400 may measure the user's eye angle with an accuracy of 1 degree, for example. The visible light 432 from the display screen 430 may pass the hot mirror 420 and the lens 410 to reach the eye 450 allowing the user to see rendered content by the display screen 430.

In particular embodiments, the headset system may use a machine learning (ML) based approach for eye tracking. The headset system may take a sequence of images of the eyes of the user wearing the headset (e.g., using a 3D eye tracking system) and use the machine learning (ML) algorithm to process the images and output vergence information. For example, the machine learning (ML) algorithm may include an inference model to determine the vergence distance and gazing point of the user. In particular embodiments, the headset system may include a hybrid approach combining 3D eye tracking and ML-based eye tracking.

However, the tracking system may not work in optimal condition all the time. For example, the eye tracking system may not be able to detect pupils if the headset is worn incorrectly by the user. As another example, the eye tracking system may have reduced accuracy and precision due to malfunctions or user error. As another example, the eye tracking data may be out of range or these is no data from the eye tracking system at all. Furthermore, some artificial reality headset systems may not even include any eye tracking system. Without reliable eye-tracking information, the artificial reality headset system's ability to ameliorate vergence-accommodation conflicts would be impaired.

In particular embodiments, the headset system may detect malfunctions of the eye tracking system. Upon detection of malfunctions, the headset system may switch states to receive one or more inputs and use a combination of these inputs to determine the vergence distance or gazing point of the user. These inputs may be based on different approaches including, for example, but not limited to, eye tracking based approaches (e.g., 3D eye tracking, ML based eye tracking), body-based approaches (e.g., head position/movement, hand position/movement, body position/movement), and content-based approaches (e.g., Z-buffer, face/object recognition, developer provided information). Particular embodiments may provide more robust eye tracking using the combination of approaches. A fusion algorithm may weight the inputs based on all these approaches and determine where the user is likely looking at, the Z depth of the display screen, and the confidence score. In particular embodiments, the fusion algorithm may determine correlations between one or more inputs and determine where the user is likely looking at based on the correlations of the inputs. For example, when the headset system detects that the user's hand has picked up a virtual object and is moving towards his face, the fusion algorithm may infer that the user is looking at the virtual object in his hand. Upon identifying the virtual object as the likely subject of the user's gaze, the headset system may determine an appropriate Z depth for the display screen. Then, the headset system may physically move the display screen associated with a varifocal system to a position corresponding to the Z-depth to solve the vergence accommodation conflict.

Figure 5:
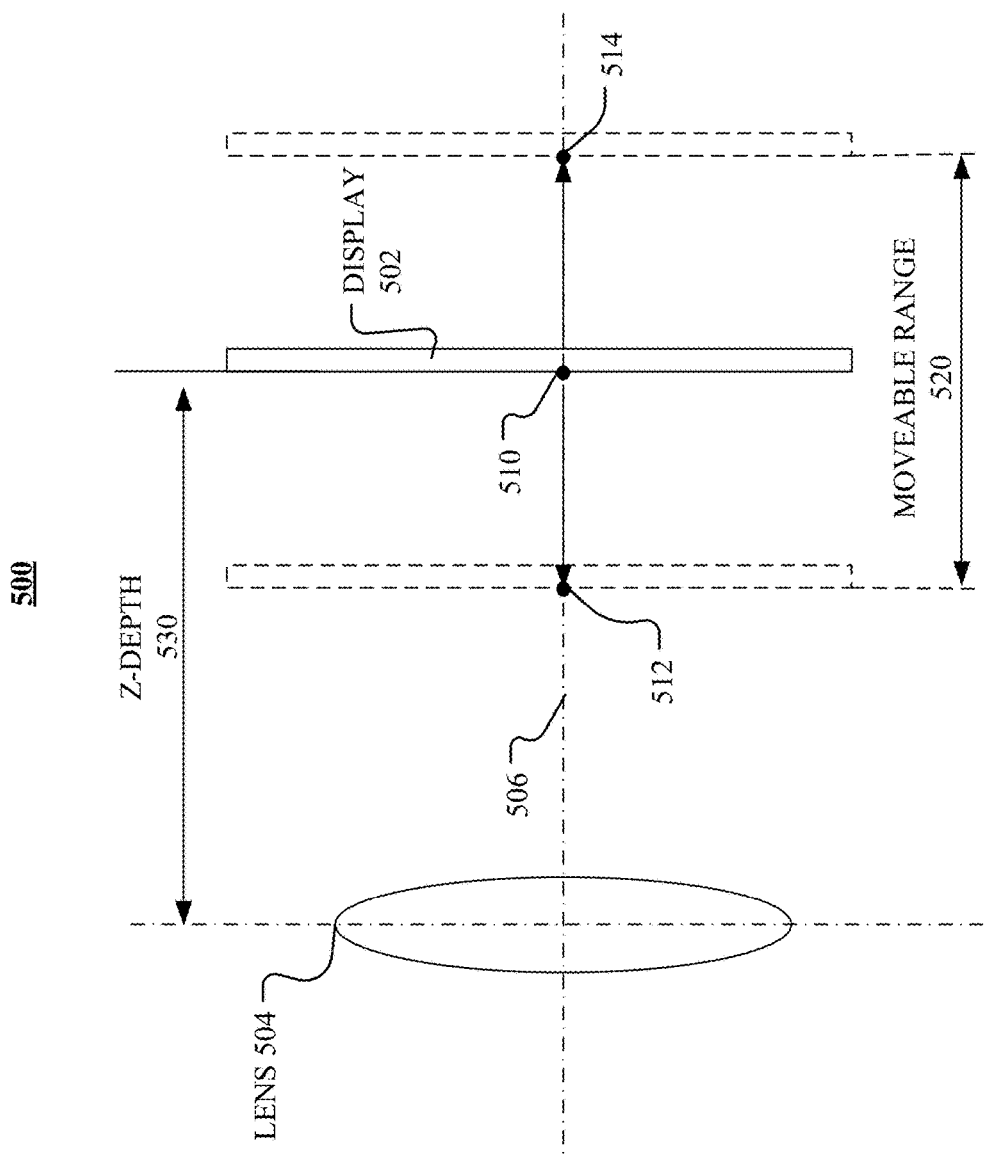
FIG. 5 illustrates an example head-mounted display having an adjustable display screen.

FIG. 5 illustrates an example head-mounted display 500 having an adjustable display screen 502. The head-mounted display 500 may have a display screen 502 and a lens 504. In particular embodiments, the display screen 502 may be moved along an axis 506 toward the lens 504 or away from the lens 504 within a movable range 520 (e.g., 1 cm) between the positions 512 and 514. The head-mounted display 500 and the lens 504 may have a distance which may be called Z-distance or Z-depth 530. The Z-depth 530 may affect the focus distance of the user's eyes. The position 512 of the display screen 502 may correspond to a situation in which the user is looking at a virtual object with a vergence distance of 25 cm. The position 514 may correspond to a situation in which the user is looking at a virtual object with a vergence distance of infinite. The lens 504 or other parts of the head-mounted display 500 may be used a reference when adjusting the display screen 502. In particular embodiments, the adjustable display screen may be associated with a varifocal system of the head-mounted display 500. The varifocal system may use the Z-depth 530 of the display screen to reconcile the focus distance and the vergence distance of the user to ameliorate the vergence accommodation conflict. In particular embodiments, the head-mounted display 500 may move an optics block associated with the lens 504 to adjust the Z-depth 530 to ameliorate the vergence accommodation conflict. In particular embodiments, the head-mounted display 500 may move both of the display screen 502 and an optics block associated with the lens 504 to adjust the Z-depth 530 to ameliorate the vergence accommodation conflict. In particular embodiments, the headset may render different images to the user based on the user's vergence distance or gazing point to eliminate or ameliorate the vergence accommodation conflict.

Figure 6:
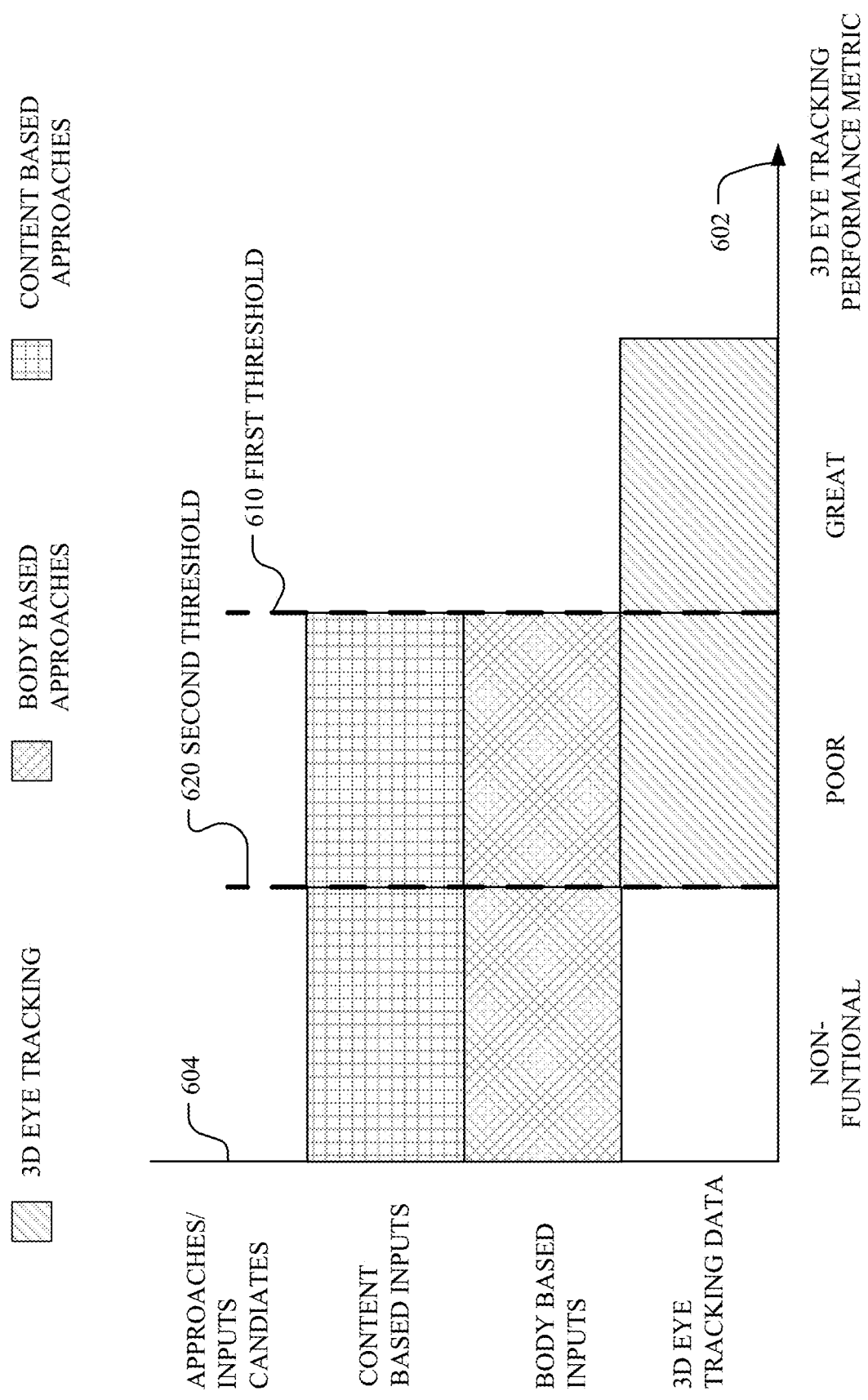
FIG. 6 illustrates an example performance evaluation chart with different body-based and content-based input combinations.

In particular embodiments, the headset system may determine one or more performance metrics and compare the performance metrics to one or more performance thresholds to evaluate of the eye tracking system performance and determine the combination of approaches accordingly. FIG. 6 illustrates an example performance evaluation chart with different combinations of the eye tracking based inputs, body-based inputs, and content-based inputs. The horizontal axis 602 may correspond to a performance metric level of the eye tracking system. The vertical axis 604 may correspond to different inputs and/or approaches under different performance conditions. The performance metric may be compared to a first threshold 610 and a second threshold 620. When the performance metric is above the first threshold 610, the eye tracking system may perform as expected in a great condition and the performance may be identified as great performance. In this situation, the headset system may continue to use the eye tracking data from the eye tracking system to determine the vergence distance and gazing point of the user and no other data or inputs are needed.

When the performance metric is below the first threshold 610 and above the second threshold 620, the performance may be identified as poor. In this situation, the eye tracking system be partially working but have some malfunctions which negatively impact the performance of the eye tracking system (e.g., reducing confidence score, reducing accuracy or/and precision of vergence distance and Z-depth determination). When the eye tracking system has poor performance, the headset system may determine a combination of inputs to determine the vergence distance and gazing point of the user with improved quality and confidence score. The combination may include eye tracking data, body-based inputs, or content-based inputs. For example, the combination may include one or more inputs of the body-based inputs. As another example, the combination may include one or more inputs of the content-based inputs. As another example, the combination may include one or more inputs of both of the body-based inputs, the content-based inputs, and the eye tracking data.

When the performance metric is below the second threshold hold 620, the eye tracking system may be identified as non-functional. In this situation, the headset system may have no eye tracking data available because the headset system does not have an eye tracking system or the eye tracking system fails to function. When the eye tracking system has poor performance, the headset system may use a combination of inputs to determine the likely vergence distance and gazing point of the user. The combination may include one or more inputs of the body-based inputs or content-based inputs.

In particular embodiments, the performance metrics may include, for example, but are not limited to, an accuracy of a parameter of the eye tracking system, a precision of a parameter of the eye tracking system, a value of a parameter of the eye tracking system, a detectability of pupil(s), a metric based on one or more parameters associated with the user, a parameter change, a parameter changing trend, a data availability, a weighted combination of one or more performance metrics or related parameters, etc. The thresholds for the performance metric may include, for example, but are not limited to, a pre-determined value, a pre-determined range, a state of a data, a changing speed of a data, a trend of a data change, etc. In particular embodiments, the thresholds may be pre-determined by developers. In particular embodiments, the thresholds may be determined by inputs from a user using the headset or may be determined adaptively using a machine learning or deep learning algorithm using current or historical data of the headset. In particular embodiments, the headset system may detect one or more malfunctions of the eye tracking system using the performance metrics. In particular embodiments, the headset system may detect malfunctions of the eye tracking system by comparing two or more parameters (e.g., information from different sensing channels) of the eye tracking data and determining whether the parameters conform to each other.

As an example and not by way of limitation, the headset system may compare a parameter value (e.g., Z-depth) of the eye tracking data to a predetermined value or range (e.g., Z-depth range as specified in a specification or manual of the headset) and determine whether the parameter value is within the predetermined range. When the parameter value is out of range, the eye tracking system may be identified as malfunctioning. As another example, the headset system may determine a changing trend of a parameter of the eye tracking data and determine that the parameter value is drifting and the deviation is beyond an acceptable range. As another example, the headset system cannot receive data from the eye tracking system and may determine that the headset does not include an eye tracking system or the eye tracking system fails to function. As another example, the eye tracking system may be not able to detect the user's pupils when the user blinks or occluded by other means. As another example, the headset system may detect that the user's eyes have some problems (e.g., eye rheology or two eyes don't converge) which prevent the eye tracking system from working appropriately.

In particular embodiments, the headset system may determine one or more parameters related to the user wearing the headset and determine that the eye tracking system performance may be negatively impacted. The user related parameter may include, for example, but are not limited to, a distance between two eyes (e.g., pupils) of the user, a pupil position, a pupil status, a correlation of two pupils of the user, a head size of the user, a position of a headset worn by the user, an angle of the headset worn by the user, a direction of the headset worn by the user, an alignment of the eyes of the user, an alignment of headset with the user's eyes, a weighted combination of one or more related parameters associated with the user, etc. The headset may compare the user related parameters to one or more standards which may be pre-determined by developers or may be adaptively determined by users or algorithms. When the user related parameters fail to meet the standards, the headset system may determine that the eye tracking system cannot perform well or cannot function in these situations. As another example and not by way of limitation, the headset system may detect that the user is wearing the headset incorrectly (e.g., incorrect direction, posture, or alignment) and the eye tracking data is not available or not accurate. As another example, the headset system may not be able to detect the user pupils and determines that the eye tracking system cannot track the eyes of the current user. As another example, the headset system may not be able detect or track the user's eyes correctly because the user is wearing prescription lenses or contact lenses which are beyond the range of support for the headset system. As another example, the headset system may determine that the user has larger pupil distance or larger head size than the headset system is designed for. In this situation, the eye tracking system may not be able to detect the pupils or may not be able to track the user gaze correctly.

In particular embodiments, the headset system may determine a confidence score for the determined vergence distance or gazing point of the user and the Z-depth of the display screen. The headset system may compare the confidence score to a confidence level threshold to determine whether the determined vergence distance or gazing point meets the pre-determined requirements (e.g., precision, accuracy, updating rate, stability). In particular embodiments, the headset system may constantly evaluate quality of the determined vergence distance or gazing point using the confidence score to determine whether further data is needed to improve the determination quality. For example, the headset system may determine the vergence distance and gazing point based on the body-based inputs and the confidence score being above the confidence level threshold. In this situation, there is no need for other data other than the body-based inputs. As another example, the headset system may determine that the confidence score for the determined vergence distance or gazing point does not meet the pre-determined requirements and the headset system needs further data (e.g., more body-based input, eye tracking data, or content-based inputs) to improve the determination quality and confidence score.

When the performance metric is below the first threshold, the eye tracking system performance may be poor or nonfunctional. The headset system may receive one or more first input associated with the body of a user wearing the headset. The headset system may determine a region that the user is looking at within the field of view of a head-mounted display of the headset worn by the user. The region that the user is looking at may be determined based on the received one or more first inputs associated with the body of the user. The headset system may compare the region that the user is looking at with locations of one or more objects in a scene displayed on the head-mounted display to determine which objects in the scene fall in that region. Then, the headset system may determine the likely vergence distance or gazing point of the user based on the one or more first inputs associated with the body of the user, the region that the user is looking at, and/or the displayed objects in the scene that fall in that region. The vergence distance may be a distance from the user's eyes to the virtual objects, assuming the user is looking at the virtual objects. A gazing point may be a point in the virtual space where the user is gazing at. The headset system may adjust the position of a display screen of the head-mounted display based on the determined vergence distance of the user. In particular embodiments, the headset system may determine the vergence distance or gazing point based on one or more content-based inputs other than the body-based inputs. In particular embodiments, the headset system may determine the vergence distance or gazing point based on both the body-based inputs and content-based inputs. In particular embodiments, the headset system may determine the vergence distance or gazing point based on the eye tracking data, the body-based inputs, and the content-based inputs. In particular embodiments, the headset system may adjust one or more configurations of the head-mounted display based on the determined vergence distance or gazing point of the user to eliminate or ameliorate the vergence accommodation conflict. The headset system may configure the head-mounted display by rendering different images to the user, adjusting a position of a display screen, or adjusting an optics block based on the determined vergence distance or gazing point of the user.

In particular embodiments, the first inputs associated with the body of the user may include, for example, but are not limited to, a hand position, a hand direction, a hand movement, a hand gesture, a head position, a head gaze, a head direction, a head movement, a head gesture, a body gesture, a body posture, a body movement, a behavior of the user, or a weighted combination of one or more related parameters. In particular embodiments, the body-based inputs may include position, movement, or status of any other body parts of the user other than eyes. In particular embodiments, the headset system may include one or more user input devices or sensing devices including, for example, but not limited to, a controller, one or more sensors, a camera, a microphone, an accelerometer, a mobile device, or other user input devices. The user input devices or sensing devices may be associated with the user wearing the headset and may communicate with the headset system through wireless or wired connections. The user input devices or sensing devices may track the motion or status of the user and send data to the headset system. The headset system may receive the one or more first input associated with the user from one or more of the user input devices or sensing devices. The user input devices or sensing devices may be separate devices from the headset or may be integrated to the headset.

As an example and not by way of limitation, the user wearing the headset may hold a controller in one or two hands. The user may use the controller to select or interact with one or more objects in the field of view of the head-mounted display of the headset. The objects may be virtual objects rendered by the head-mounted headset, real-world objects captured by one or more cameras and displayed on the head-mounted display, or real-world objects that the user sees through an augmented reality headset. The interaction between the user and objects may be tracked by the controller and sent to the headset system. As another example, the user' hand(s) holding the controller(s) may move in the three-dimensional space and motion (e.g., velocity, direction, acceleration, trajectory, pattern, angle, gesture, position, correlation or coordination of two hands) may be tracked by the controller(s). As another example, the headset may include one or more sensors to measure the head direction, gaze angle, head movement, head posture, etc. As another example, the headset system may include one or more sensors mounted on the body of the user and the sensor may measure the body movement (e.g., velocity, direction, acceleration, trajectory, pattern, angle, gesture, position, correlation or coordination between multiple parts of body or multiple users), body posture, or body position of the user. As another example, the headset system may include a camera which monitors the behavior and action of the user. The camera may be integrated to the headset or may be installed in the environment where the user is located communicating with the headset through wireless or wired connections.

In particular embodiments, when the headset system identifies the eye tracking system performance as poor (i.e., partially functional but in non-perfect condition), the headset system may continue to receive the eye tracking data from the eye tracking system. The system may determine the vergence distance or gazing point of the user based on data from the eye tracking system. The headset system may receive one or more first inputs associated with the body of the user. The headset system may determine the vergence distance and gazing point of the user based on the eye tracking data and the one or more first inputs associated with the body of the user. In particular embodiments, the headset system may firstly determine vergence or gazing point using the eye tracking data and determine that the confidence score is below the confidence level threshold. Then, the headset system may use the body-based inputs to improve the quality (e.g., accuracy) of the determined vergence distance and gazing point and improve the confidence level of the determination.

In particular embodiments, when the performance of the eye tracking system is identified as poor, the headset system may continue to receive eye tracking data from the eye tracking system and determine the vergence distance and gazing point based on the eye tracking data. The headset system may further receive one or more first inputs associated with the body of the user and one or more second input associated with one or more displaying elements in the displaying content of a scene rendered by the head-mounted display. The headset system may determine the vergence distance and gazing point of the user based on a combination of the eye tracking data, the one or more first inputs associated with the body of the user, or the one or more second inputs associated with the displaying content.

In particular embodiments, the one or more second inputs associated with one or more displaying elements in the displaying content of a scene may include, for example, but are not limited to, a Z-buffer value associated with a displaying element, a displaying element marked by a developer, an image analysis result, a shape of a displaying element, a face recognition result, an object recognition result, a person identified in a displaying content, an object identified in a displaying content, a correlation of two or more displaying elements, or a weighted combination of the one or more content-based inputs. In particular embodiments, the content-based inputs may include one or more parameters generated by computer vision algorithms including, for example, but not limited to, face recognition, object recognition, machine learning, deep learning, background-foreground analysis, image analysis, other computer vision algorithms, etc. In particular embodiments, the displaying elements associated with the content-based inputs may be associated with a virtual object rendered in a virtual space by a head-mounted display or a real-world object in the field of view of the user wearing an augmented reality headset. The display elements may include, for example, but are not limited to, an object (e.g., tree, building), a computer-generated content (e.g., text, icon, figures, illustration), a person, or a background view.

Figure 7:
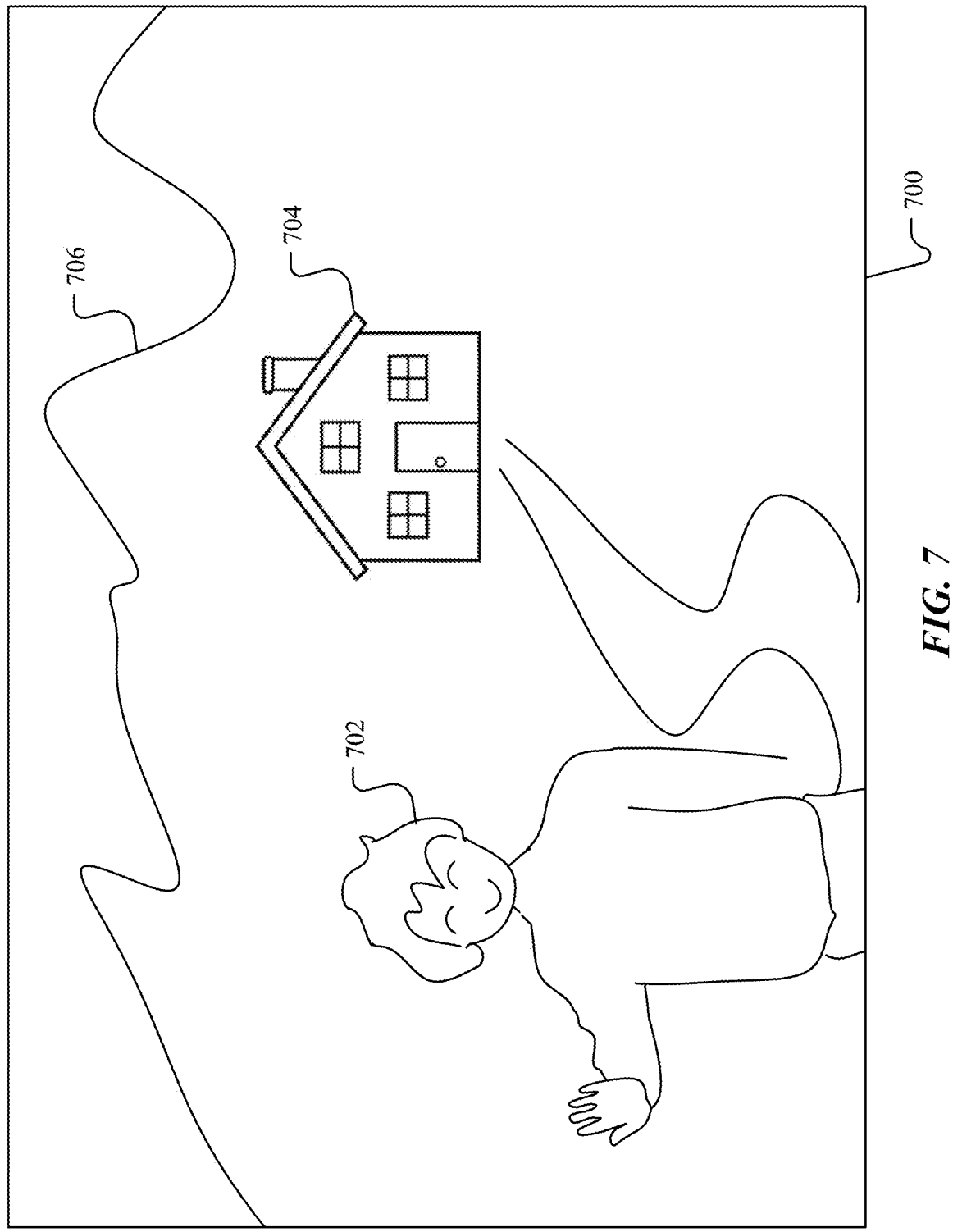
FIG. 7 illustrates an example scene in the field of view of the user wearing an artificial reality headset.

FIG. 7 illustrates an example scene 700 in the field of view of the user wearing an artificial reality headset. The scene 700 may include a person 702, a house 704, and background mountains 706. In particular embodiments, the scene 700 may be a virtual reality scene rendered in a virtual space by the headset and in the field of view of the user wearing the headset. In particular embodiments, the scene 700 may be a real-world scene in the field of view of the user wearing an augmented reality headset. In particular embodiments, the headset system may determine the vergence distance or gazing point of the user with a confidence score (e.g., above a pre-determined threshold) based on one or more second inputs associated with the displayed content (e.g., a person 702, a house 704, mountains 706) of the scene. As an example and not by way of limitation, the headset system may determine that the person 702 has been marked by developers of the displayed content (e.g., a virtual reality game or application) as the focus of the scene 700 of this moment (or implicitly marked as such by making the person 702 appear in-focus while making the rest of the scene out-of-focus). The headset system may determine that the Z-depth of the display screen based on the Z-buffer value related to one or more pixels of the person 702 and adjust the display screen based on the determined Z-depth which allows the person 702 to be in focus. As another example, a game developer may directly program the headset system to move the display screen to force the user to look at a portion of the scene by making that portion of the scene to be more focus than other portion of the scene. As another example, the headset system may detect the person 702 using face recognition and determine that the person 702 is moving toward the user at this movement using motion detection over a series of scenes. The headset may infer the person 702 should be the focus of the user in this scene and determine the Z-depth of the screen based the Z-buffer values related to the pixels of the person 702 and move the display screen accordingly. As another example, the headset system may determine, based on head gaze information, that the user is looking at the person 702, and use the Z-buffer related to pixels of the person 702 to determine the Z-depth of the display screen. As another example, the headset system may determine (e.g., using object recognition) that there are two objects in the scene, and determine that the user is likely looking at the object which is closer to the user in the visual space. As another example, the headset system may determine that the user has been pursuing a virtual object (e.g., in a game) in preceding scenes, and determine that the user is likely still looking that that virtual object in current scene. As another example, the headset system may predict a ballistic of the user's gazing point based on the tracked moving direction and speed of the user's gazing point in previous scenes and determine the object that the user is looking at.

In particular embodiments, the headset system may determine the Z-depth of the display screen based on a weighted average of Z-buffer values related to pixels of multiple displayed contents (e.g., a person 702, a house 704, mountains 706) and move the display screen accordingly to allow the user to have a better view for the scene 700 overall. As an example and not by way of limitation, the headset system may use a weighted combination or average of Z-buffer values from 81 points (e.g., a 9×9 grid) of a scene to determine the display screen Z-depth which allows the areas related to these points to be in focus for the user. The headset system may assign different weight scores to different points based on the relative importance of the corresponding areas in the scene.

In particular embodiments, the headset system may determine that the user is looking at a particular region of the scene (e.g., based on body-based inputs or eye tracking data) and use computer vision algorithms (e.g., face recognition, object recognition, background-foreground segmentation) to determine the objects displayed in that region and further determine the Z-depth of the display screen based on the Z-buffer values related to pixels of the recognized object in that region. As an example and not by way of limitation, the headset system may determine that, using body-based inputs, the user is looking at the middle part of the scene 700. The headset system may use object recognition to detect that the house 704 is in the middle part of the scene 700 and determine the Z-depth of the display screen using the Z-buffer values related to pixels of the house 704 and move the display screen accordingly.

In particular embodiments, when the performance of the eye tracking system is identified as non-functional, the headset system may receive one or more first inputs associated with the body of the user and one or more second input associated with one or more displaying elements in the displaying content of a scene rendered by the head-mounted display. The headset system may determine the vergence distance and gazing point of the user based at least on a combination of the one or more first inputs associated with the body of the user and the one or more second inputs associated with the displaying content.

Figure 8A:
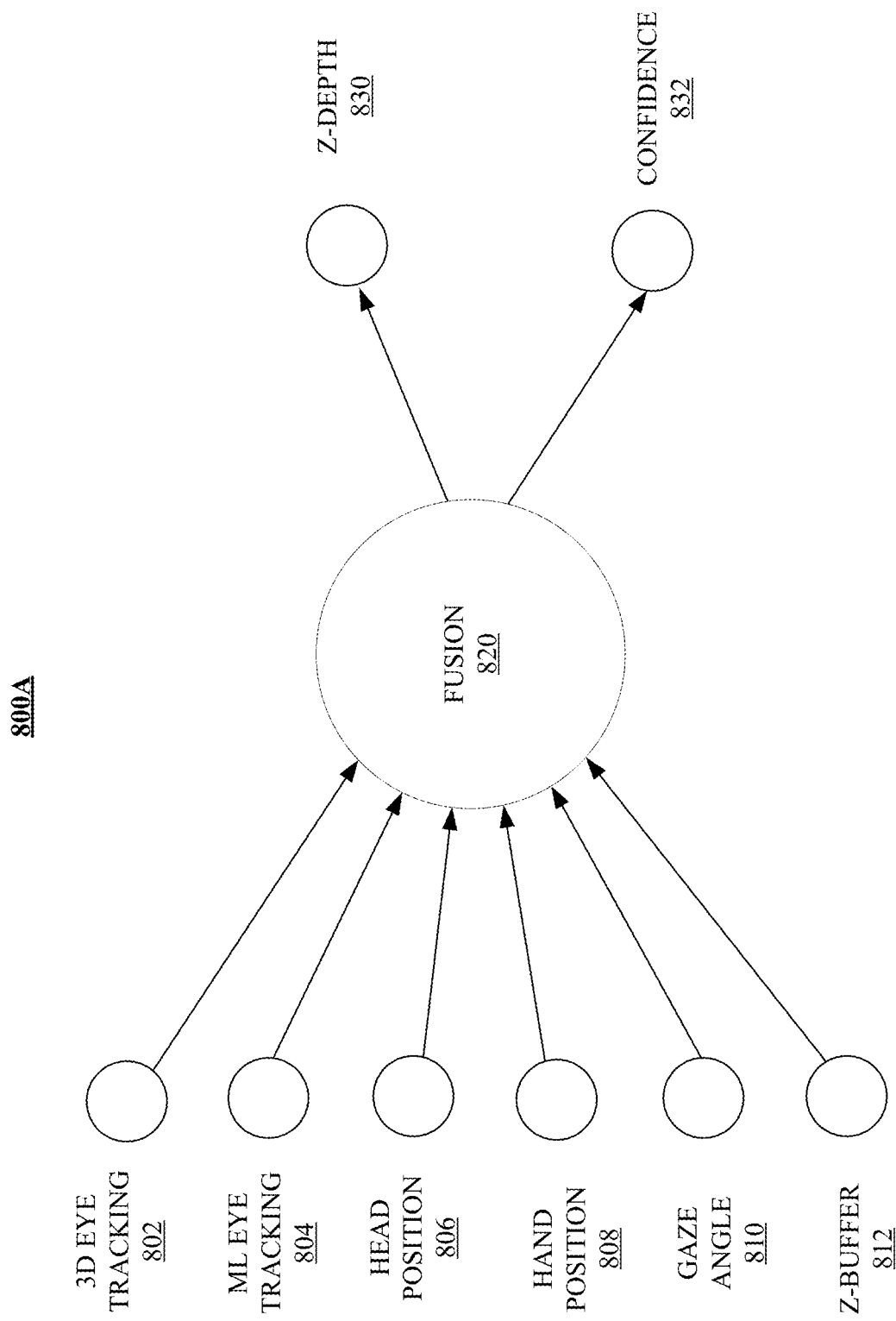
FIG. 8A illustrates an example fusion algorithm for determining display screen Z-depth and confidence score.

FIG. 8A illustrates an example fusion algorithm 800A for determining display screen Z-depth and confidence score. The inputs to the fusion algorithm 800A may include, for example, but are not limited to, 3D eye tracking data 802, ML-based eye tracking data 804, head position 806, hand position 806, gaze angle 810, Z-buffer 812, developer provided information, etc. The fusion algorithm 800A may weight all inputs of the fusion algorithm and determine the appropriate Z-depth 830 for the display screen and a confidence score 832. The fusion algorithm 800A may constantly monitor all or a portion of the inputs and assign a weight score to each input based on the quality (e.g., accuracy, precision, availability, data rate) or importance of that input. In particular embodiments, when a particular input has higher quality than other inputs, the fusion algorithm may assign a higher weighting score to that particular input. For example, when the 3D eye tracking data is available and relatively accurate, the fusion algorithm may assign a higher weight score for the eye tracking data than other inputs. As another example, when the performance of the 3D eye tracking system is poor, the fusion algorithm may increase weight scores for other inputs and reduce the weight score for the 3D eye tracking data.

Figure 8B:
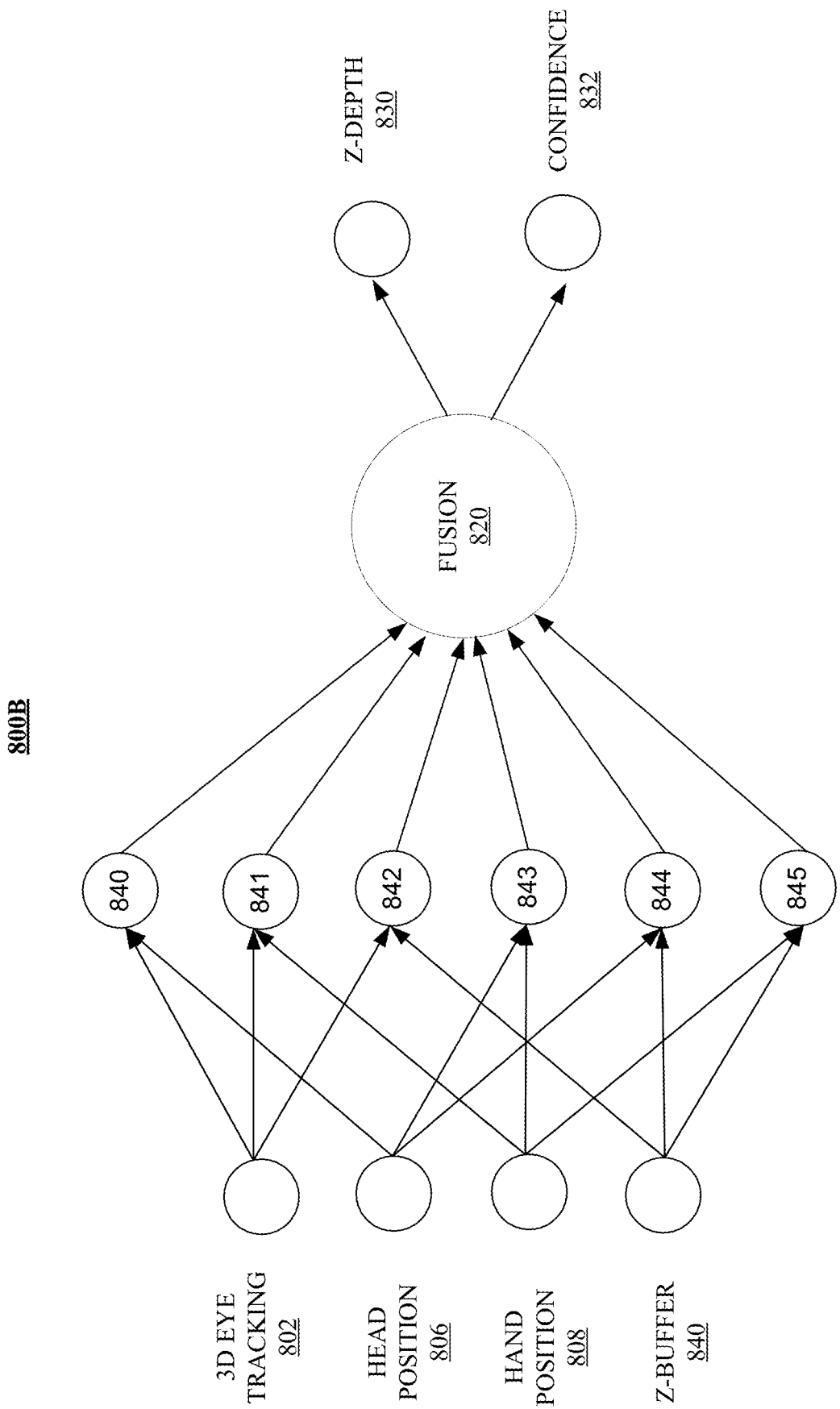
FIG. 8B illustrates an example fusion algorithm using piecewise comparisons on inputs.

FIG. 8B illustrates an example fusion algorithm 800B using piecewise comparisons on inputs. For simplicity of description, only four inputs of the fusion algorithm 800B are illustrated in FIG. 8B. However, the fusion algorithm 800B may include all the possible inputs of eye tracking data (e.g., 3D eye tracking, ML-based eye tracking), body-based inputs (e.g., head position, hand position, gaze angle), and content-based input (e.g., Z-buffer, face/object recognition, developer provided information). In particular embodiments, the fusion algorithm 800B may use piecewise comparisons (e.g., 840, 841, 842, 843, 844, 845) to compare and analyze each pair of the inputs to determine corrections between the inputs. In particular embodiments, the fusion algorithm may compare multiple inputs to determine the correlations between them. In particular embodiments, the fusion algorithm may use multi-level comparison and analysis to determine the correlations of the inputs. The fusion algorithm 800B may determine where the user is looking at based on the correlations of the inputs and, consequently, the Z-depth for the display screen and confidence score.

As an example and not by way of limitation, the fusion algorithm may determine that the user's hand is moving toward the user's head while holding a virtual object in the hand. The fusion algorithm may determine that the user is likely looking at the virtual object in his hand. The fusion algorithm may determine Z-depth for the display screen based on the virtual object in the user's hand with a confidence score of 0.6 (e.g., 60% confidence level). The fusion algorithm may further analyze the head gazing direction and gazing angle of the user and determine that the user is gazing at the moving hand region. The fusion algorithm may determine that the user is looking at the virtual object in hand with a confidence score of 0.9 (i.e., 90% confidence level). The hand position of the user may be tracked by a controller hold by the user. The headset system may actuate the varifocal system dynamically based on the head-hand position of the user to keep the virtual object in focus for the user.

As another example, the fusion algorithm may recognize a person in the field of view of the user and the person is moving toward the user at a certain speed. The fusion algorithm may determine that the user is looking at the moving person in the scene with a confidence score 0.8 (i.e., 80% confidence level). The fusion algorithm may further improve the confidence score to 0.9 (i.e., 90% confidence level) using the information that the user had been looking at the moving person in a preceding scene. The fusion algorithm may determine the Z-distance based on the moving person. As another example, the fusion algorithm may determine that the user's head moves corresponding to the motion of a virtual object (e.g., the head moves to look up and down or left and right synchronized with the virtual object's motion). The fusion algorithm may determine that the user is looking at the moving virtual object with a confidence score of 0.9 (i.e., 90% confidence level).

In particular embodiments, the fusion algorithm may determine the Z-depth and confidence score using a particular combination of inputs. The fusion algorithm may compare the confidence score of this determination to a confidence score threshold to determine whether this combination provides results meeting the quality requirements. The fusion algorithm may accept this Z-depth result when the confidence score is above the threshold. The fusion algorithm may search and try other combination of inputs when the confidence score is below the threshold. In particular embodiments, the fusion algorithm may determine the Z-depth and confidence score using different combinations of the inputs. The fusion algorithm may rank the combinations based on the confidence scores of the determination and select the combination with the highest confidence score. The fusion algorithm may build a matrix with N dimensions for the exhaustive piecewise comparisons of all inputs and determine the correlations that lead to the highest confidence score for the Z-depth result.

In particular embodiments, the fusion algorithm may include a machine learning or deep learning algorithm to determine the combination of the inputs. The machine learning model may be trained using data of different inputs and determine which combination of inputs leads to the highest confidence score for Z-depth determination. In particular embodiments, the machine learning algorithm may further determine the Z-depth and the confidence score based on the selected combination of inputs. In particular embodiments, the fusion algorithm may evaluate each input in parallel to speed up the computation process.

Figure 9:
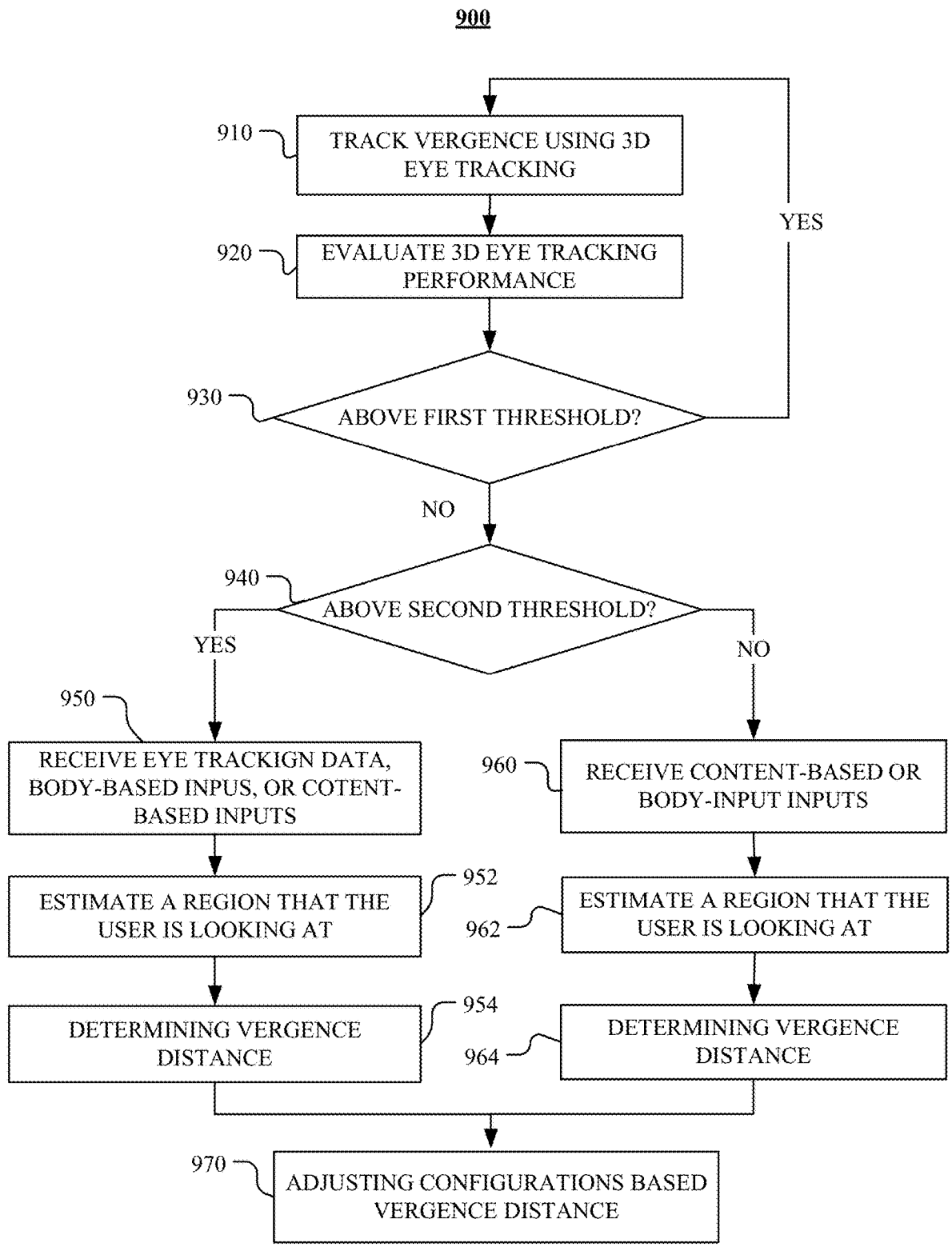
FIG. 9 illustrates an example method for determining vergence distance of the user based on a combination of inputs.

FIG. 9 illustrates an example method 900 for determining vergence distance of the user based on a combination of inputs. At step 910, the headset system may use a 3D eye tracking system to track the user vergence. At step 920, the headset system may evaluate the performance (e.g., great, poor, non-functional) of the eye tracking system when tracking the user vergence. In particular embodiments, the headset system may evaluate the eye tracking system performance constantly at pre-determined or adaptively determined frequencies. The headset system may calculate one or more performance metrics (e.g., accuracy, precision, data availability) based on data from the eye tracking system. In particular embodiments, the headset system may use a particular performance metric, multiple performance metrics, or a weighted combination of multiple performance metrics to evaluate the performance of the eye tracking system. At step 930, the headset system may compare a performance metric to the first threshold. When the performance metric is above the first threshold, the eye tracking system performance may be considered as great. The headset system may continue to track user vergence using the eye tracking system with great accuracy and precision and there is no need for other data. When the performance metric is below the first threshold, the eye tracking system performance can be poor or non-functional. At step 940, the headset system may compare the performance metric to the second threshold.

When the performance metric is above the second threshold and below the first threshold, the eye tracking system performance may be considered as poor. In this situation, the eye tracking system may be partially working but have some malfunctions. At step 950, the headset system may receive eye tracking data, body-based inputs, or content-based inputs and determine the combination of inputs using a fusion algorithm (e.g., based on availability and quality of the inputs or a resulting confidence score). At step 952, the headset system may estimate a region that the user is looking at within a field of view of the head-mounted display based on the combination of the inputs. At step 954, the fusion algorithm may weight all inputs and determine the vergence distance or gazing point of the user based at least on the combination of the received inputs, the estimated region that the user is looking at, and locations of one or more objects in a scene displayed on the head-mounted display. The headset system may determine the Z-depth of the display screen (and a confidence score) based on the vergence distance or gazing point of the user using the fusion algorithm. In particular embodiments, the combination of inputs may include one or more body-based inputs. In particular embodiments, the combination of inputs may include one or more content-based input. In particular embodiments, the combination of inputs may include one or more inputs of the eye tracking data, the body-based inputs, and the content-based inputs.

When the performance metric is below the second threshold, the eye tracking system is non-functional and the eye tracking data is not available. At step 960, the headset system may receive body-based inputs or content-based inputs and determine the combination of inputs using the fusion algorithm. At step 962, the headset system may estimate a region that the user is looking at within a field of view of the head-mounted display based on the combination of the inputs. At step 954, the fusion algorithm may weight all inputs and determine the vergence distance or gazing point of the user based at least on the combination of the received inputs, the estimated region that the user is looking at, and locations of one or more objects in a scene displayed on the head-mounted display. The headset system may determine the Z-depth of the display screen (and a confidence score) based on the vergence distance or gazing point of the user using the fusion algorithm. In particular embodiments, the combination of inputs may include one or more body-based inputs. In particular embodiments, the combination of inputs may include one or more content-based input. In particular embodiments, the combination of inputs may include one or more inputs of the body-based inputs and the content-based inputs.

At step 970, the headset system may reconfigure the head-mounted display based on the determined vergence distance or gazing point of the user to eliminate or ameliorate the vergence accommodation conflict. The headset system may adjust the configurations of the head-mounted display by rendering different images to the user, adjusting a position of a display screen, or adjusting a position of an optics block (e.g., position) based on the determined vergence distance or gazing point of the user. Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for determining vergence distance of the user based on a combination of inputs including the particular steps of the method of FIG. 9, this disclosure contemplates any suitable method for determining vergence distance of the user based on a combination of inputs including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Figure 10:
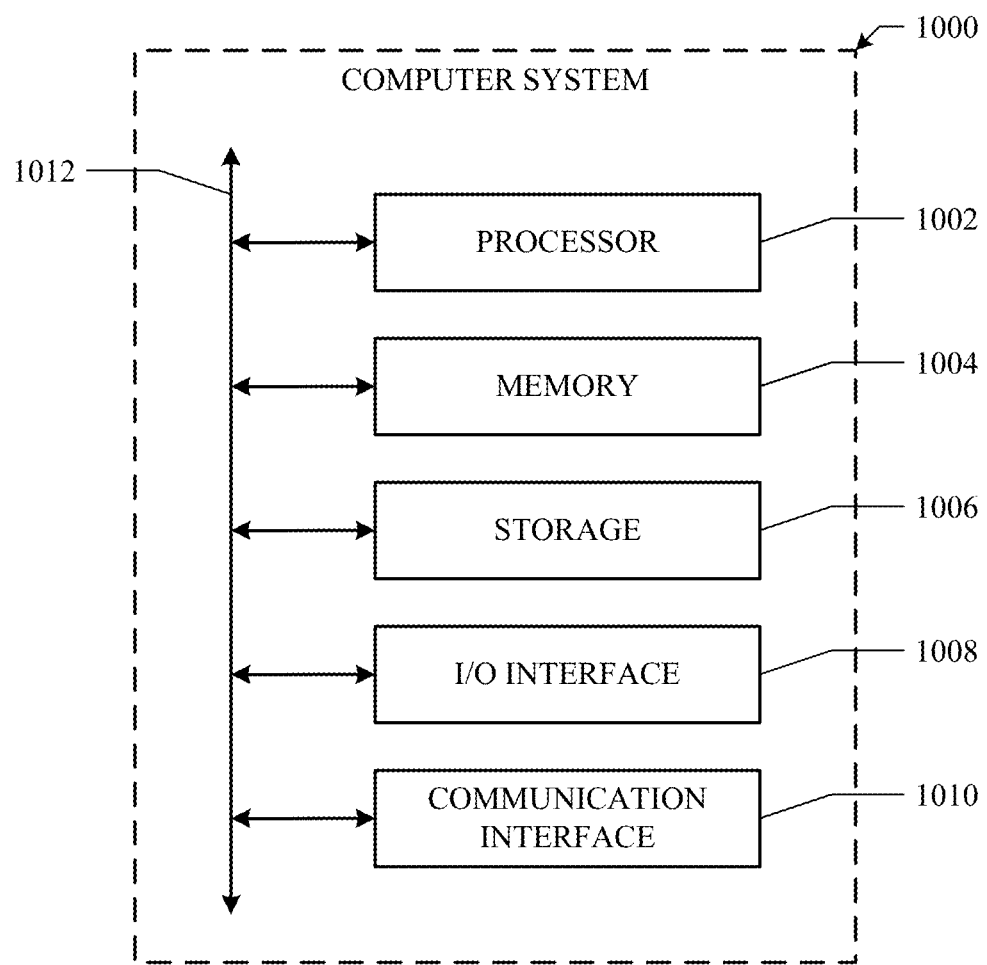
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   determining that a performance metric of an eye tracking system is below a performance threshold, wherein the eye tracking system is associated with a head-mounted display worn by a user;
   in response to the determination that the performance metric is below the performance threshold, identifying one or more contents being displayed by the head-mounted display;
   accessing, based on the identified one or more contents, one or more properties of the one or more contents;
   predicting a vergence distance of the user based at least on the one or more properties associated with the one or more display contents; and
   adjusting one or more configurations associated with the head-mounted display based on the predicted vergence distance of the user.

2. The method of claim 1, further comprising:
   determining that the performance metric of the eye tracking system is below a second performance threshold; and
   receiving one or more inputs associated with a body of the user, wherein the vergence distance of the user is predicted based at least on the one or more inputs associated with the body of the user and the one or more properties of the one or more contents being displayed by the head-mounted display.

3. The method of claim 2, wherein determining that the performance metric of the eye tracking system is below the second performance threshold comprises determining that the eye tracking system does not exist or fails to provide eye tracking data.

4. The method of claim 2, further comprising:
   estimating a region that the user is looking at within a field of view of the head-mounted display based on the received one or more inputs associated with the body of the user, wherein the vergence distance of the user is predicted based at least on the estimated region that the user is looking at in the field of view of the head-mounted display and locations of the one or more contents displayed by the head-mounted display.

5. The method of claim 1, further comprising:
determining that the performance metric of the eye tracking system is above a second performance threshold; and
receiving eye tracking data from the eye tracking system, wherein the vergence distance of the user is predicted based at least on the eye tracking data, the one or more inputs associated with the body of the user, and the one or more properties associated with the one or more contents being displayed by the head-mounted display.

6. The method of claim 5, wherein the one or more inputs associated with the body of the user comprise one or more of: a hand position, a hand direction, a hand movement, a hand gesture, a head position, a head direction, a head movement, a head gesture, a gaze angle, a body gesture, a body posture, a body movement, a behavior of the user, or a weighted combination of one or more related parameters.

7. The method of claim 6, wherein the one or more inputs associated with the body of the user are received from one or more of: a controller, a sensor, a camera, a microphone, an accelerometer, a headset worn by the user, or a mobile device.

8. The method of claim 1, further comprising:
feeding a first combination of inputs into a fusion algorithm for predicting the vergence distance of the user, wherein the first combination of inputs comprise one or more inputs associated with a body of the user, one or more properties of the one or more contents being displayed, or eye tracking data of the eye tracking system.

9. The method of claim 8, further comprising:
determining, by the fusion algorithm, a first confidence score for the predicted vergence distance of the user;
in response to a determination that the first confidence score is below a confidence threshold, feeding a second combination of inputs to the fusion algorithm, wherein the second combination of inputs is different from the first combination of inputs; and
determining a new vergence distance of the user based the second combination of inputs, wherein the new vergence distance is associated with a second confidence score higher than the first confidence score.

10. The method of claim 9, further comprising:
determining, using the fusion algorithm, a Z-depth of a display screen of the head-mounted display based on the first combination of inputs, wherein adjusting one or more configurations comprising adjusting a position of the display screen of the head-mounted display based on the determined Z-depth of the display screen.

11. The method of claim 10, wherein the Z-depth and the first and second confidence scores are determined by the fusion algorithm using a piecewise comparison of two or more inputs of the first combination of inputs.

12. The method of claim 10, wherein the Z-depth and the first and second confidence scores are determined based on a correlation between two or more inputs of the first combination of inputs.

13. The method of claim 8, wherein the fusion algorithm comprises a machine learning (ML) algorithm, and wherein the first combination of inputs fed to the fusion algorithm are determined by the machine-learning algorithm.

14. The method of claim 1, wherein the one or more properties of the one or more contents being displayed comprise one or more of: a Z-buffer value associated with a displaying element, a displaying element marked by a developer, an image analysis result, a shape of a displaying element, a face recognition result, an object recognition result, a person identified in a displaying content, an object identified in a displaying content, a correlation of two or more displaying elements, or a weighted combination of the one or more second inputs.

15. The method of claim 1, wherein the performance metric of the eye tracking system comprises one or more of: an accuracy of a parameter from the eye tracking system, a precision of a parameter from the eye tracking system, a value of a parameter from the eye tracking system, a detectability of a pupil, a metric based on one or more parameters associated with the user, a parameter change, a parameter changing trend, a data availability, or a weighted combination of one or more performance parameters.

16. The method of claim 15, wherein the one or more parameters associated with the user comprise one or more of: an eye distance of the user, a pupil position, a pupil status, a correlation of two pupils of the user, a head size of the user, a position of a headset worn by the user, an angle of the headset worn by the user, a direction of the headset worn by the user, an alignment of the eyes of the user, or a weighted combination of one or more related parameters associated with the user.

17. The method of claim 1, wherein the performance threshold is associated with one or more of: a pre-determined value, a pre-determined range, a state of a data, a changing speed of a data, or a trend of a data change.

18. The method of claim 1, wherein the one or more configurations associated with the head-mounted display are associated with one or more of: a rendering image, a position of a display screen, or a position of an optics block.

19. One or more computer-readable non-transitory storage media embodying software that is operable when executed to:
determine that a performance metric of an eye tracking system is below a performance threshold, wherein the eye tracking system is associated with a head-mounted display worn by a user;
in response to the determination that the performance metric is below the performance threshold, identify one or more contents being displayed by the head-mounted display;
access, based on the identified one or more contents, one or more properties of the one or more contents;
predict a vergence distance of the user based at least on the one or more properties associated with the one or more display contents; and
adjust one or more configurations associated with the head-mounted display based on the predicted vergence distance of the user.

20. A system comprising:
one or more non-transitory computer-readable storage media embodying instructions; and
one or more processors coupled to the storage media and operable to execute the instructions to:
determine that a performance metric of an eye tracking system is below a performance threshold, wherein the eye tracking system is associated with a head-mounted display worn by a user;

in response to the determination that the performance metric is below the performance threshold, identify one or more contents being displayed by the head-mounted display;
access, based on the identified one or more contents, one or more properties of the one or more contents;
predict a vergence distance of the user based at least on the one or more properties associated with the one or more display contents; and
adjust one or more configurations associated with the head-mounted display based on the predicted vergence distance of the user.

\* \* \* \* \*